United States Patent
Spruth et al.

(10) Patent No.: US 9,751,546 B2
(45) Date of Patent: Sep. 5, 2017

(54) WHEELED LADDER CADDY

(71) Applicants: Michael Paul Spruth, Colorado Springs, CO (US); Dan Allen, Ten Sleep, WY (US)

(72) Inventors: Michael Paul Spruth, Colorado Springs, CO (US); Dan Allen, Ten Sleep, WY (US)

(*) Notice: Subject to any disclaimer, the term of this patent is extended or adjusted under 35 U.S.C. 154(b) by 0 days.

(21) Appl. No.: 15/223,470

(22) Filed: Jul. 29, 2016

(65) Prior Publication Data
US 2016/0355204 A1    Dec. 8, 2016

Related U.S. Application Data

(63) Continuation-in-part of application No. 14/793,535, filed on Jul. 7, 2015, now abandoned.

(60) Provisional application No. 62/170,003, filed on Jun. 2, 2015.

(51) Int. Cl.
*B62B 1/26* (2006.01)
*B62B 1/14* (2006.01)
*E06C 7/00* (2006.01)
*E06C 1/397* (2006.01)

(52) U.S. Cl.
CPC .......... *B62B 1/262* (2013.01); *B62B 1/142* (2013.01); *E06C 7/00* (2013.01); *E06C 1/397* (2013.01)

(58) Field of Classification Search
CPC .................. B62B 1/14; B62B 1/142
See application file for complete search history.

(56) References Cited

U.S. PATENT DOCUMENTS

| 750,402 | A | | 1/1904 | Sechler | |
|---|---|---|---|---|---|
| 1,221,579 | A | | 4/1917 | Olds | |
| 2,398,812 | A | | 4/1946 | Steil | |
| 2,499,091 | A | | 2/1950 | Brubaker | |
| 2,761,691 | A | * | 9/1956 | George | B62B 1/262 |
| | | | | | 211/70.2 |
| 2,883,207 | A | * | 4/1959 | Reich | B62B 1/262 |
| | | | | | 280/13 |
| 3,026,960 | A | | 3/1962 | Koutnik | |
| 3,074,507 | A | | 1/1963 | Pelky | |
| 3,164,393 | A | * | 1/1965 | Upham, II | B62B 1/262 |
| | | | | | 211/70.2 |

(Continued)

OTHER PUBLICATIONS

Office Action dated Apr. 13, 2016 from U.S. Appl. No. 14/793,535, filed Jul. 7, 2015.

*Primary Examiner* — Kevin Hurley
(74) *Attorney, Agent, or Firm* — Sunstone IP

(57) ABSTRACT

A wheeled ladder caddy is provided. The caddy can transport one or more long and slender items thereon. The caddy has a base and a mount coupled to the base and extending away therefrom. The mount defines a cavity therein. The caddy may also include a securing mechanism coupled to the base, the securing mechanism including an engagement member and a fastener, wherein the fastener can transition between a first position and a second position to position the engagement member with respect to the base. The item may be placed in the caddy such that the cavity receives a part of the item and the securing mechanism receives a second part. The fastener can transition from the first position to the second position to translate the engagement member toward the base to retain the item between the engagement member and the base.

17 Claims, 5 Drawing Sheets

(56) References Cited

U.S. PATENT DOCUMENTS

| | | | |
|---|---|---|---|
| 3,356,383 A * | 12/1967 | Sneed | B62B 1/18 280/47.26 |
| 3,396,815 A | 8/1968 | Gleockler | |
| 3,666,054 A | 5/1972 | Ellings et al. | |
| 3,731,947 A | 5/1973 | Fontaine | |
| 3,857,460 A | 12/1974 | Nini | |
| 3,954,155 A | 5/1976 | Guidara | |
| 3,991,852 A | 11/1976 | Brookes et al. | |
| 4,009,762 A | 3/1977 | Bjerkgard | |
| 4,049,283 A * | 9/1977 | Brookes | B62B 5/0083 182/127 |
| 4,098,518 A * | 7/1978 | Minkoff | B62B 3/108 280/47.131 |
| 4,564,203 A * | 1/1986 | Wilson | B62B 1/26 182/127 |
| 4,938,312 A * | 7/1990 | Trail | E06C 7/488 182/206 |
| 5,382,032 A | 1/1995 | Wilson | |
| 5,566,780 A * | 10/1996 | Bambrough | A01M 31/02 182/116 |
| 5,727,799 A | 3/1998 | DiSario | |
| 5,820,145 A * | 10/1998 | Osowski | B62B 1/268 280/47.19 |
| 5,833,028 A * | 11/1998 | Ramsey | E06C 7/48 182/108 |
| 5,879,014 A * | 3/1999 | Price | B62B 3/02 280/47.18 |
| 5,882,023 A | 3/1999 | Swager | |
| 6,209,681 B1 | 4/2001 | DiSario | |
| 6,250,655 B1 * | 6/2001 | Sheeks | B62B 1/268 280/47.18 |
| 6,328,330 B1 * | 12/2001 | Haaser | B62B 1/20 182/21 |
| 6,585,084 B2 | 7/2003 | Gannon | |
| 6,592,134 B2 | 7/2003 | Abraham | |
| 6,641,147 B2 * | 11/2003 | Werner | B62B 3/1472 280/33.991 |
| 6,708,993 B2 | 3/2004 | Feik | |
| 6,860,364 B1 | 3/2005 | Deemer | |
| 6,880,835 B2 | 4/2005 | Tornabene et al. | |
| 6,896,273 B2 | 5/2005 | Forsberg et al. | |
| 7,036,631 B2 * | 5/2006 | Feik | E06C 7/50 182/127 |
| 7,156,204 B2 | 1/2007 | Gross | |
| 7,484,594 B1 | 2/2009 | Feliciano, Jr. et al. | |
| 8,556,277 B1 | 10/2013 | Bolinski | |
| 8,678,329 B1 | 3/2014 | Bryant, Sr. et al. | |
| 8,967,634 B2 * | 3/2015 | Barnes | B62B 1/142 280/43.11 |
| 9,266,545 B2 * | 2/2016 | Robinson | B62B 1/26 |
| 2004/0256817 A1 * | 12/2004 | Sandoval | B62B 1/142 280/47.26 |
| 2007/0023232 A1 | 2/2007 | Eastwood et al. | |
| 2007/0029138 A1 | 2/2007 | Howe | |
| 2009/0101437 A1 * | 4/2009 | Abraham | B62B 5/0083 182/129 |
| 2014/0332485 A1 | 11/2014 | Rich | |

* cited by examiner

WHEELED LADDER CADDY

CROSS REFERENCE TO RELATED APPLICATION(S)

This application is a continuation-in-part of U.S. patent application Ser. No. 14/793,535 to Spruth et al. entitled "LADDER CADDY PLUS," filed Jul. 7, 2015, which claims priority to U.S. Provisional Patent Application No. 62/170,003 to Spruth et al. entitled "LADDER CADDY PLUS," filed Jun. 2, 2015, the disclosures of which are hereby incorporated entirely herein by reference.

BACKGROUND

Technical Field

The present disclosure relates to hand trucks, caddies or dollies, and, more particularly, to a hand truck, caddy or dolly for transporting long, slender equipment and materials to and fro over surfaces.

State of the Art

Long and slender equipment and materials can be burdensome to transport from one location to another. The weight distribution of these items can make the carrying thereof difficult. Moreover, obstacles at the location of use can get in the way of the convenient and efficient transportation of these items. For example, ladders and lumber, which can be long and slender and can be used on construction sites, including new home construction as well as other structures, oftentimes need to be moved from one location at the site to another location at the site. Due to their length, it is difficult to maneuver these items in, around, and/or through the construction.

As such, there is a need in the industry to address these concerns. It would therefore be advantageous to provide a simpler, more efficient, and cost-effective means and method of transporting long and slender items.

SUMMARY

The present disclosure relates to hand trucks, caddies or dollies, and, more particularly, to a hand truck, caddy or dolly for transporting long and slender equipment and materials, such as, for example, ladders and lumber, to and fro over surfaces.

An aspect of the present disclosure includes a caddy for transporting one or more long and slender items, the caddy comprising: a base having a first face and a second face; a tray coupled to the first face and extending away therefrom, the tray defining a tray opening; a substantially rigid clamping mechanism coupled to the base, the clamping mechanism configured to transition toward the first face; and a wheel assembly coupled to the base on the second face; wherein the tray opening receives a first portion of an item and the clamping mechanism engages a second portion of the item, wherein as the clamping mechanism transitions toward the first face the clamping mechanism retains the item between the clamping mechanism and the first face by friction fit.

Another aspect of the present disclosure includes wherein the base is configured to pivot about the wheel assembly to transition the caddy between an upright position and a prone position.

Another aspect of the present disclosure includes wherein with the item coupled to the caddy, a force on the item transitions the caddy between the upright and prone positions.

Another aspect of the present disclosure includes wherein in the prone position a length of the item is closer to horizontal than vertical.

Another aspect of the present disclosure includes wherein in the prone position the item is oriented on its side.

Another aspect of the present disclosure includes wherein the first portion of the item is a foot or end thereof and the second portion of the item is a leg thereof.

Another aspect of the present disclosure includes wherein the item is dimensional lumber.

Another aspect of the present disclosure includes wherein the item is a ladder and the first portion is a foot of each of a front rail and a corresponding back rail of the ladder, and wherein the second portion is a leg of each of the front rail and the corresponding back rail.

Another aspect of the present disclosure includes clamping mechanism further comprising an engagement member, a fastener, and a support, wherein the support is in communication with the base and functionally couples the fastener to the engagement member with the engagement member and the fastener positioned on opposing sides of the base, wherein with the ladder coupled to the caddy the engagement member contacts the front rail and the corresponding back rail, the fastener maintains the engagement member in contact with the front rail and the corresponding back rail, and the support is configured between the front rail and the corresponding back rail.

Another aspect of the present disclosure includes a caddy for transporting a ladder, the caddy comprising: a substantially rigid base; a mount coupled to the base and extending therefrom, the mount defining a cavity; an engagement member operatively coupled to the base and configured to transition with respect to the base; and a wheel assembly comprising an axle coupled to the base and a pair of wheels coupled to opposing ends of the axle; wherein the cavity receives a foot of each of a front rail and a corresponding back rail of the ladder and the engagement member transitions toward the base to contact each of the front rail and the corresponding back rail to engage by friction fit the ladder between the engagement member and the base.

Another aspect of the present disclosure includes a fastener in operative communication with the engagement member and configured to transition and secure the engagement member in position with respect to the base.

Another aspect of the present disclosure includes ridges on the mount, wherein the ridges define the cavity and are configured to prevent the ladder from slipping out of the cavity.

Another aspect of the present disclosure includes wherein a width between the wheels is less than 13.5 inches.

Another aspect of the present disclosure includes wings on the engagement member, wherein the wings protrude from distal ends of the engagement member toward the base.

Another aspect of the present disclosure includes wherein the base is configured to pivot about the axle to transition the caddy between an upright position and a prone position.

Another aspect of the present disclosure includes wherein with the ladder coupled to the caddy, a force on the ladder transitions the caddy between the upright and prone positions.

Another aspect of the present disclosure includes wherein in the prone position a length of the ladder is closer to horizontal than vertical.

Another aspect of the present disclosure includes wherein with the ladder coupled to the caddy and the caddy in the prone position the ladder is oriented on its side.

Another aspect of the present disclosure includes a method of transporting a ladder on a caddy, the method comprising: providing a caddy with a first face and a second face, the caddy having a mount coupled to the first face and a wheel assembly coupled to the second face; inserting a foot of each of a front rail of the ladder and a corresponding back rail of the ladder into a cavity of the mount protruding from the base; coupling by press fit each of the front rail and the corresponding back rail between the first face of the base and an engagement member in communication with the base; applying force to the ladder to transition the caddy from a first position to a second position, wherein in the second position the ladder is less vertical than in the first position; transporting the ladder on the caddy.

Another aspect of the present disclosure includes wherein the ladder is oriented on its side during the transportation of the ladder on the caddy.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

Figure 1:
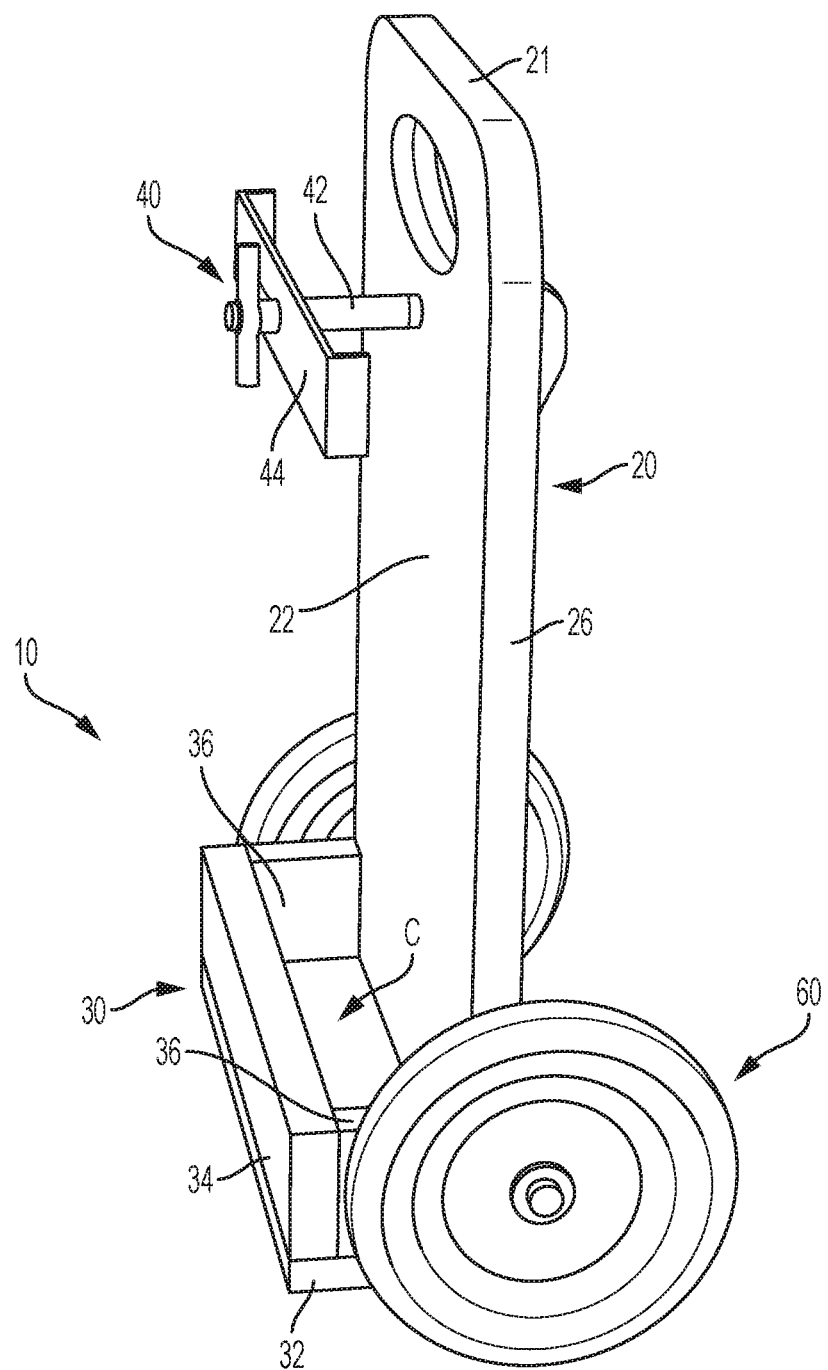
FIG. 1 is a side perspective view of an embodiment of a caddy for carrying long and slender items in accordance with the present disclosure.

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The drawings depict illustrative embodiments of a caddy 10. These embodiments may each comprise various structural and functional components that complement one another to provide the unique functionality and performance of the caddy 10, the structure and function of which will be described in greater detail herein. For example, embodiments of the caddy 10 may comprise one or more of a base 20, a mount 30, a securing mechanism 40, and/or a wheel assembly 50, among other components to be described herein. The caddy 10 may alternatively be referred to herein as a dolly or hand truck.

Referring to FIGS. 1-5, embodiments of the caddy 10 may comprise a base 20. The base 20 may be a rectangular member configured to provide rigidity and structure to the caddy 10. The base 20 may assume other geometric shapes provided the requisite rigidity is established and maintained. The requisite rigidity is enough to support an item 8 thereon during transport of the item 8 on the caddy 10. The base 20 may comprise a first face 22 and a second face 24 that opposes the first face 22. The base 20 may also comprise a first end 21 and a second end 23, with a length L of the base 20 being defined between the first end 21 and the second end 23. The base 20 may further comprise opposing side edges 26 that define therebetween a width W of the base 20. The base 20 may further comprise a grip portion or handle 28 for ease of use and transportation. The handle 28 may be a protrusion from the base 20 or may alternatively be a hollow, recess, indentation in the base 20, or even an opening through the base 20.

Embodiments of the caddy 10 may further comprise the length L of the base 20 being between 12 and 24 inches, and may alternatively be between about 18 to 22 inches. Embodiments of the caddy 10 may provide the length L of the base 20 being about 20 inches to provide stability to the caddy 10 during transport of an item 8 thereon, to be described in detail herein. Embodiments of the caddy 10 may further comprise the width W of the base 20 being between 6 and 13 inches, and may alternatively be between about 8 to 11 inches. Embodiments of the caddy 10 may provide the width W of the base 20 being about 10 inches to provide stability to the caddy 10 during transport of the item 8 thereon, to be described in detail herein.

Embodiments of the caddy 10 may further comprise a mount 30, which may additionally be referred to herein as a tray. The tray or mount 30 may be coupled to the base 20. The mount 30 may be fixedly coupled to the base 20, or, in the alternative, the mount 30 may be releasably coupled to the base 20. The mount 30 may be configured to receive a portion of the item 8 thereon or therein. The mount 30 may be configured to secure a portion of the item 8 therein for transportation of the item 8 on the caddy 10, to be described herein. The mount 30 may be coupled to the base 20 on the first face 22. The mount 30 may also be coupled to the first face 22 of the base 20 at or near the second end 23. Coupling the mount 30 to the base 20 at or near the second end 23 may provide added rigidity to the caddy 10 during the transportation of the item 8 thereon, due to the length L of the base 20 that is in contact with the item 8.

Embodiments of the caddy 10 may further comprise the mount 30 comprising a pedestal 32 that extends or otherwise protrudes a distance D from the first face 22 of the base 20. The pedestal 32 may be sized and shaped to receive and support a portion of the item 8 thereon. For example, the pedestal 32 may extend a distance D of between 1 and 4 inches from off the first face 22. Embodiments of the caddy 10 may further comprise the pedestal 32 having ridges around the perimeter thereof, the ridges defining a cavity C, or a tray opening. For example, a first ridge 34 may be configured on or near a distal edge of the pedestal 32 that resides at the distance D from the base. The first ridge 34 may rise from the pedestal 32 so as to extend from the pedestal 32 in a parallel plane with the base 20 to define the cavity C between the first ridge 34 and the first face 22 of the base 20, with the pedestal 32 defining the bottom surface of the cavity C. Between the first ridge 34 and the base 20, opposing side ridges 36 may be configured on or near and rise from the opposing sides of the pedestal 32 to define the sides of the cavity C. In other words, the first ridge 34, the opposing side ridges 36 and the first face 22 of the base may be configured to collectively define the sides of the cavity C, wherein the pedestal 32 comprises the bottom surface of the cavity C and the top of the cavity C is open to ambient surroundings. The cavity C may have interior dimensions of about 9 to 10 inches between opposing side ridges 36 and about 2 to 3 inches between the first face 22 and the first ridge 34. In this way, the portion of the item 8 may be inserted into the cavity C from the top to be engaged by the cavity C as the item 8 is transported on the caddy 10, to be described in greater detail herein. Thus, the mount 30 may function to communicate with the item 8 during transport of the item 8 on the caddy 10.

Embodiments of the caddy 10 may further comprise a securing mechanism 40, which may additionally be referred to herein as a clamping device or a clamping mechanism. The clamping device, clamping mechanism, or securing mechanism 40 may be in communication with the base 20 and function to secure the item 8 to the base 20 and thereby the caddy 10. In other words, the securing mechanism 40 may be configured to physically engage the item 8 upon the item 8 being inserted onto the caddy 10. Embodiments of the securing mechanism 40 may comprise a support 42 and an engagement member 44. The support 42 may be a device or object that is in physical and functional communication with the body 20. For example, the support 42 may be a rod or beam that passes through the body 20 from the first face 22 to the second face 24. The support 42 may be a bolt-type member having threads thereon. With the support 42 extending through the base 20, one end of the support 42 may be configured to functionally engage the engagement member 44. The engagement member 44 may be configured to be releasably coupled to the support 42. Once coupled, the engagement member 44 may be configured on the support 42 such that the engagement member 44 cannot retreat off the end of the support 42 in a direction away from the base 20. For example, a clasp, nut, wing nut, clip, catch, or other fastener-type member may be coupled to the end of the support 42 to prevent the retreat of the engagement member 44 off of the end of the support 42.

The engagement member 44 may comprise a rigid body 46 configured to contact the items 8 placed on the caddy 10. The body 46 may be configured to have distal wings 48 thereon, the distal wings 48 extending away from the body 46. Embodiments of the engagement member 44 may comprise the distal wings 48 being oriented to extend back toward the first face 22 of the base 20. The distal wings 48 may be configured of a size and shape to secure the items 8 between the rigid body 46 and the base 20 and prevent these items 8 from escaping out the side. Moreover, the engagement member 44 may be configured to rotate, spin, or otherwise move about the axis of the support 42. The engagement member 44 may also be able to slide, translate, or otherwise move along the axial length of the support 42. Such movement between the engagement member 44 and the support 42 may permit the engagement member 44 to adjust for various sizes and shapes of items 8 to be engaged thereby.

Embodiments of the securing mechanism 40 may comprise a fastener 50. The fastener 50 may be configured to functionally engage and communicate with an opposing end of the support 42 (i.e., opposite that of the end engaging the engagement member 44) that extends beyond the second face 24 of the body 20. The fastener 50 may be configured to fasten, adjust, regulate, tighten, or otherwise manage the movement and contact force of the engagement member 44 against the items 8. For example, the fastener 50 may be configured to move between a first position, or an open position, that relieves the contact force exerted by the engagement member 44 against the items 8, and a second position, or a closed position, that establishes or increases the contact force exerted by the engagement member 44 against the items 8. The fastener 50 may be configured to be pivotably or moveably coupled to the support 42, so that the fastener 50 may move with respect to the support 42 but yet maintain physical and functional engagement with the support 42. In the first position, the fastener 50 may permit the support 42 to be loosely engaged on the base 20 with the engagement member 44 positioned near the items 8 or loosely against any items 8 placed between the engagement member 44 and the base 20. However, as the fastener 50 is transitioned to the second position, the geometry and configuration of the fastener 50 with respect to the base 20 and the support 42 may cause the support 42 to translate in the axial direction to thereby pull the engagement member 44 toward the base 20 to thereby generate force in the axial direction and cause the engagement member 44 to press the items 8 against the base 20 to fixedly, or at least securely, retain the items 8 therebetween by press fit and/or friction fit.

Embodiments of the caddy 10 may further comprise a wheel assembly 60. The wheel assembly 60 may comprise an axle 62 coupled to the base 20, the axle 62 having one or more wheels 64 rotatably coupled thereto. The axle 62 may define an axis A, about which the wheels 64 may be configured to rotate, roll, turn, or otherwise spin. The wheels 64 may define therebetween a width W. Embodiments of the caddy 10 may comprise the width W between the wheels 64 being equal to or greater than a width of the base 20. In other words, the wheels 64, coupled to the distal ends of the axle 62, may protrude outside the dimensions of the base 20, such that the width W between the wheels 64 defines the largest width of the caddy 10. In the alternative, embodiments of the caddy 10 may comprise the width W between the wheels 64 being less than or equal to the width of the base 20. In other words, the wheels 64 may be inset within the dimensions of the base 20, such that the width W between the wheels 64 is less than the largest width of the caddy 10.

Figure 2:
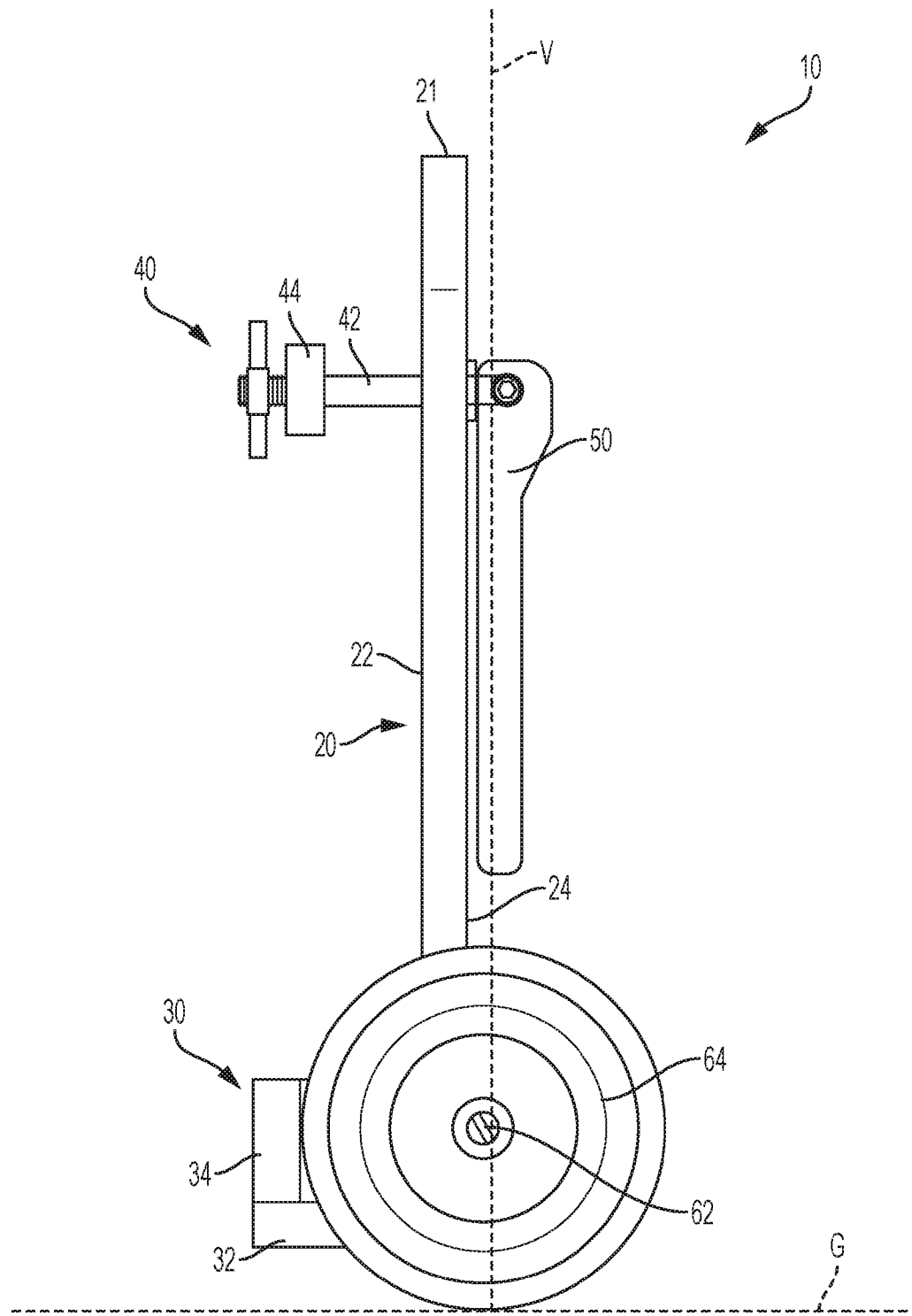
FIG. 2 is a side view of an embodiment of a caddy for carrying long and slender items in accordance with the present disclosure.
Figure 3:
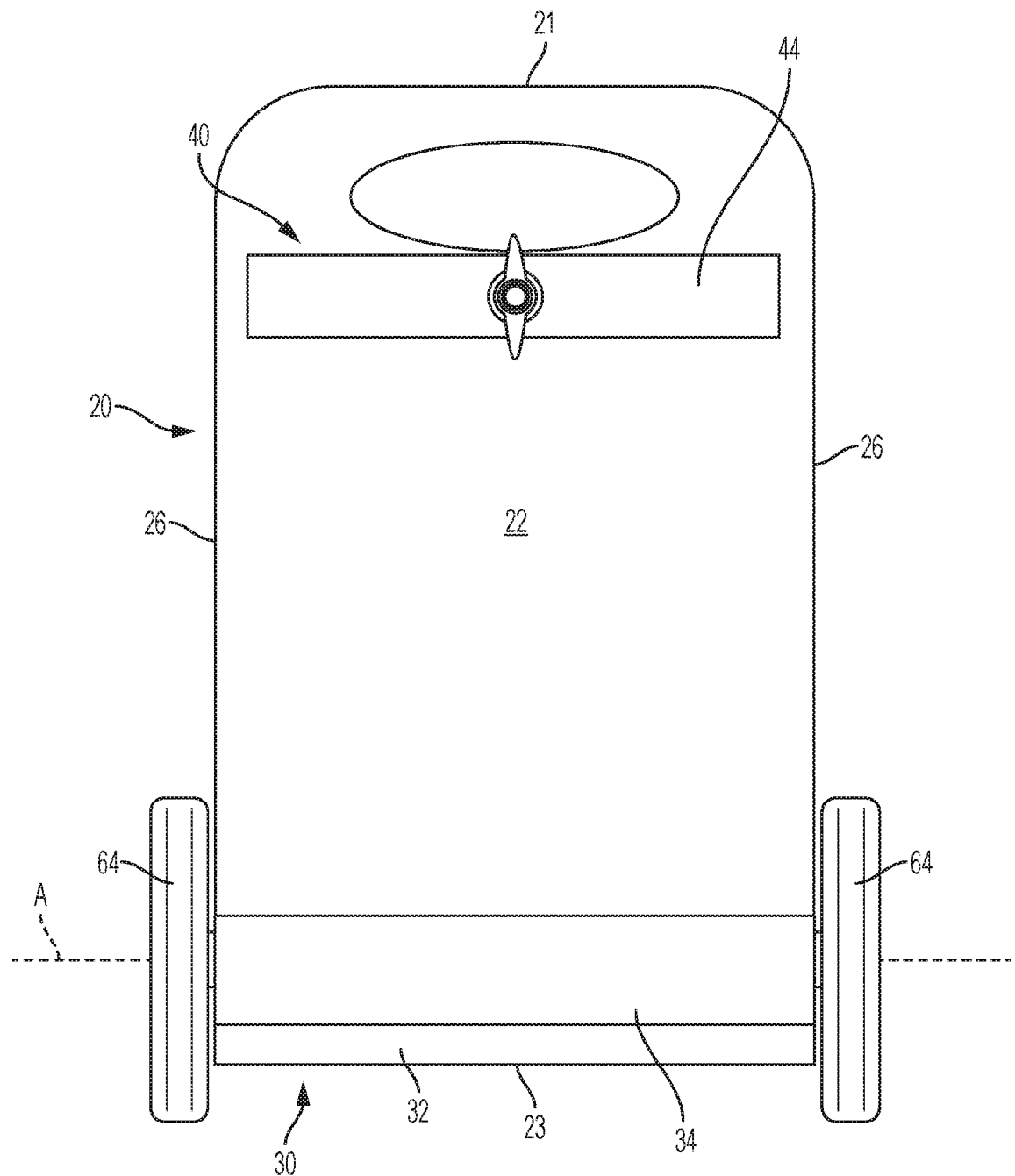
FIG. 3 is a front view of an embodiment of a caddy for carrying long and slender items in accordance with the present disclosure.
Figure 4:
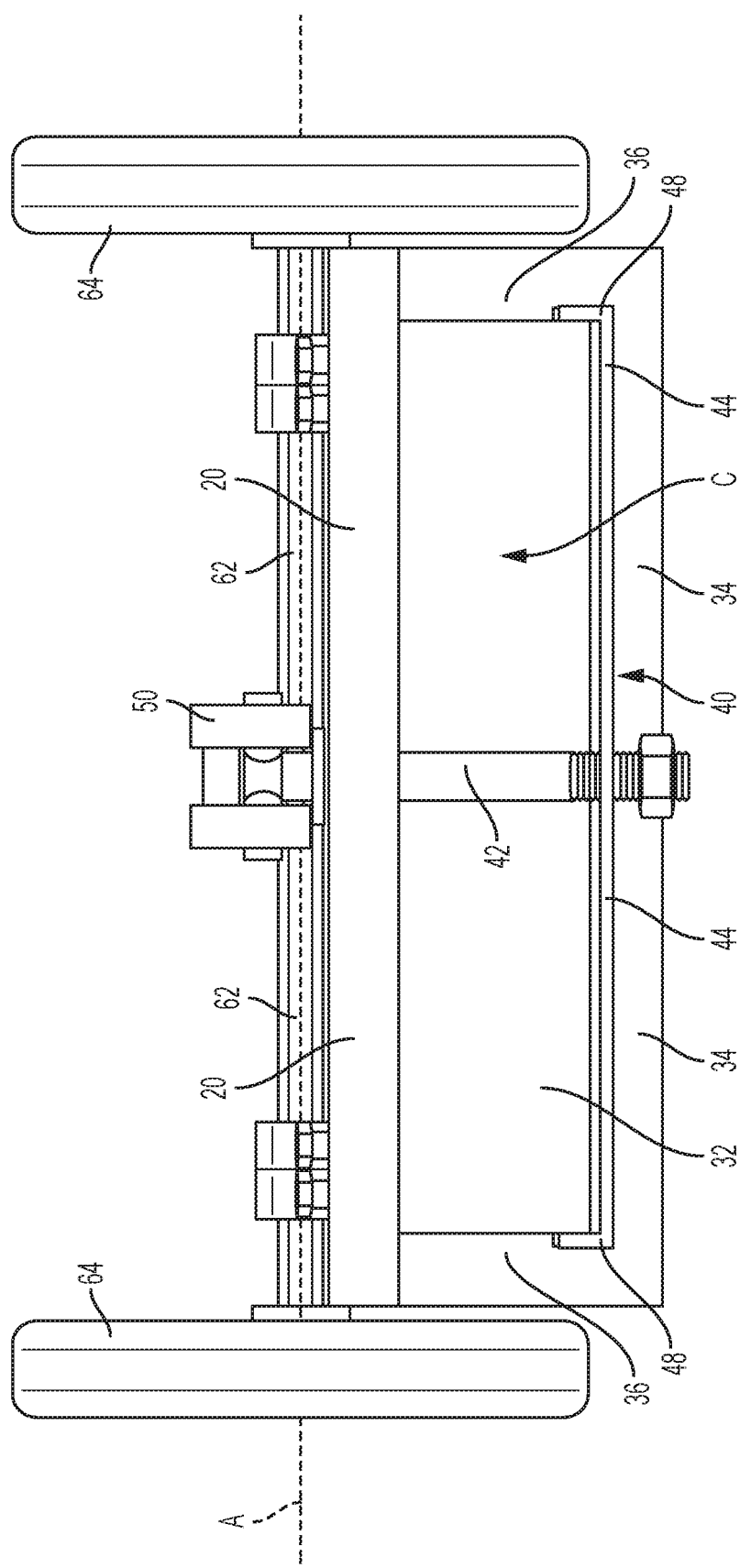
FIG. 4 is a top view of an embodiment of a caddy for carrying long and slender items in accordance with the present disclosure.
Figure 5:
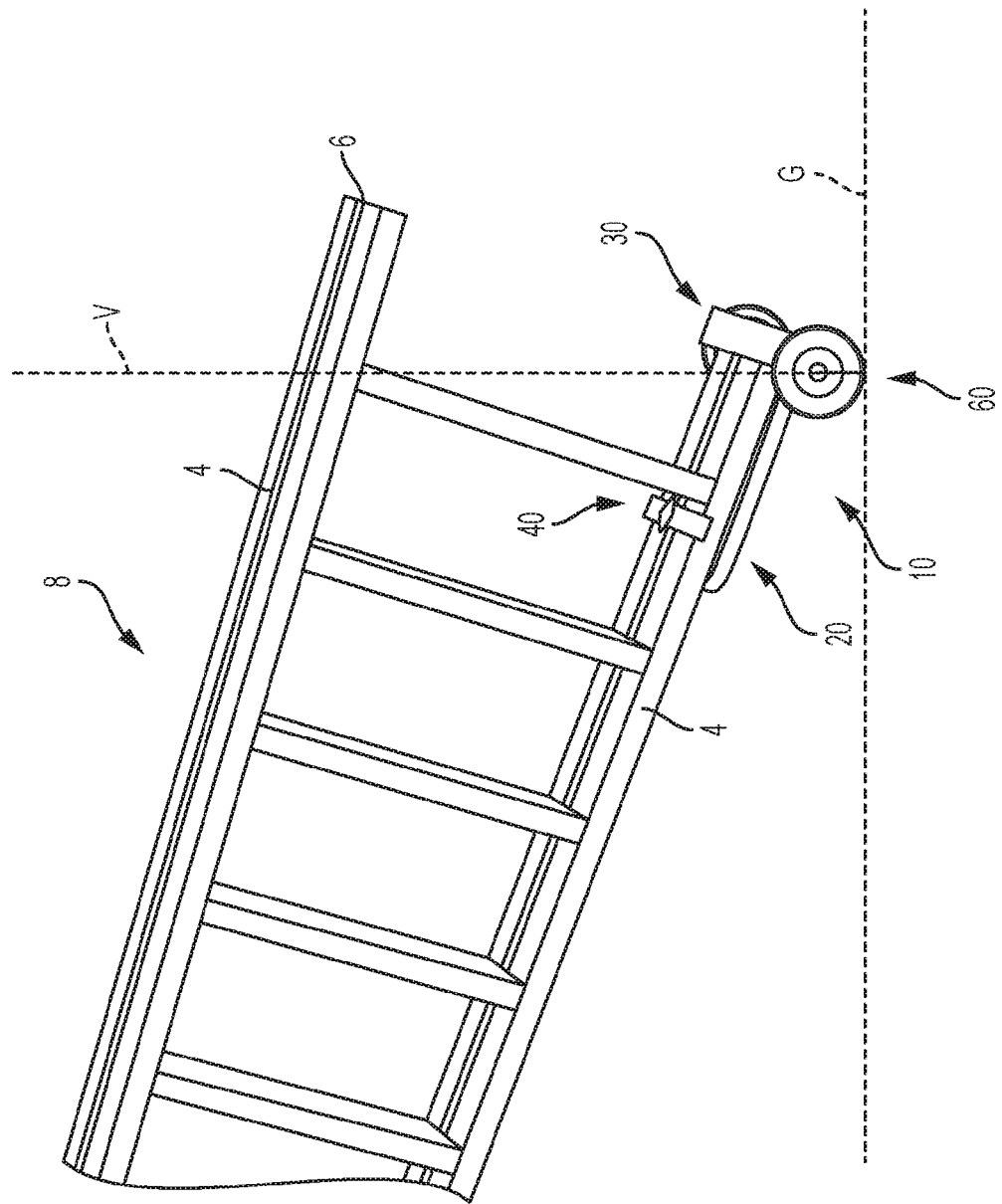
FIG. 5 a side perspective view of an embodiment of a caddy that is carrying long and slender item, such as a ladder, in accordance with the present disclosure.

Embodiments of the caddy 10 may further comprise the axle 62 being coupled to the base 20, such as, for example, at the second face 24 of the base 20. The axle 62 may be releasably coupled to the base 20 or, in the alternative, may be fixedly coupled to the base 20. The axle 62 may be positioned with respect to the base 20 such that the axle 62 is positioned a predetermined length from the second end 23 that is less than a radius of the wheels 64. In this way, the axle 62 may be positioned on the caddy 10 to allow the wheels 64 to a ground surface and keep the caddy 10, and in particular the second end 23 as well as the mount 30, up off the ground surface on which the caddy 10 may rest, roll, move, or otherwise transition. Such an arrangement allows the caddy 10 to roll with respect to the ground surface. Moreover, such an arrangement allows the caddy 10 to pivot about the axis A as force F is applied to the caddy 10. For example, when a force F is applied to the caddy 10, such as on the base 20 near the first end 21, the caddy 10 may pivot about the axis A between a first position and a second position, wherein the first position has the length L of the base 20 in an upright, substantially vertical orientation to a vertical plane V with respect to the ground surface G, as depicted in FIG. 2, and the second position is a position somewhere between the first position and a prone, substantially horizontal position with respect to the ground surface G. Indeed, the second position may be a position oblique to both the vertical plane V and the ground surface G, as depicted in FIG. 5.

Embodiments of the caddy 10 may further comprise the securing mechanism 40 being configured about 12 to 16 inches above the second end 23 of the base 20. In this way, the securing mechanism 40 may engage the item 8 about 12 to 16 inches above the mount 30. Doing so provides that the mount 30 physically engages the feet or distal ends 6 of the item 8 and the securing mechanism 40 physically engages the legs or rails 4 of the item 8 about 12 to 16 inches above the distal ends 6 thereof. By engaging the item 8 at multiple positions in accordance with the foregoing, the item 8 may be utilized by a user as a lever of sorts to transition the caddy 10 from the upright position to another non-upright position. In the upright position, the base 20 may have a substantially vertical alignment with the ground surface such that the mount 30 may contact the ground surface to prevent the caddy 10 from rolling, sliding, or otherwise moving. However, in the non-vertical position, the caddy 10 may be rotated about the axis A to allow the mount 30 to be lifted up off the ground surface to allow the caddy 10 to be moved or rolled by the user from one position to another position with the item 8 attached thereto. Indeed, the user may control the direction of movement of the caddy 10 and thereby the item 8 by applying force to the item 8 to govern the movement of the caddy 10 on the wheels 64.

Embodiments of the caddy 10 may further comprise the item 8 being oriented on its side once coupled to the caddy 10. For example, the item 8 may be a ladder having two front rails and two corresponding back rails, with rungs 2 positioned at predetermined intervals between each of the two front rails and the two corresponding back rails. The ladder may have a front face and a back face, where the user may ascend the ladder by climbing the front face. The sides of the ladder may be defined as the surfaces of the ladder that are between the front face and the back face. With this in mind, an explanation of the mounting of the ladder to the caddy 10, or vice versa, is provided. The ladder may be coupled to the caddy 10 such that an exterior surface of the side portion of each of a front rail and a corresponding back rail may contact the first face 22 of the base. In like manner, the securing mechanism 40 may be configured to contact the opposing interior surface of the side portion of the same front rail and corresponding back rail to secure the front and back rail to the caddy 10 by friction fit between the securing mechanism 40 and the base 20. In other words, the securing mechanism 40 exerts force on the interior side of the rails to push the exterior side of the rails against the base 20 to secure the ladder by friction fit to the caddy 10. Similarly, the cavity C or tray opening of the mount 30 is configured to receive the feet of the same front rail and corresponding back rail to secure these feet to the mount 30 and thus the caddy 10. Thus, the caddy 10 may be configured to releasably couple to at least multiple contact points on one pair of corresponding front and back rails, such that when the ladder is thereafter tipped on its side, the caddy 10 transitions to the non-upright orientation to allow the wheels 64 to roll to move the caddy 10 and the item 8, such as the ladder, mounted thereto.

Embodiments of the caddy 10 may further comprise the support 42 being positioned between the front rail and the corresponding back rail with the ladder coupled to the caddy 10. As such, when the support 42 axially advances in response to the fastener 50 to draw the securing mechanism 40 toward the first face 22, the support 42 is centrally located with respect to the securing mechanism 40 to allow the applied force from the securing mechanism 40 to be centrally located and evenly distributed against the item 8, such as the ladder.

In addition to the components of the caddy 10 described above, methods of transporting long and slender items 8 utilizing embodiments of the caddy 10 are herein described. The method may comprise providing a caddy, such as that described herein, for coupling to a long and slender item(s), such as lumber, dimensional lumber, or ladders, including step ladders, to transport the item(s) from one location to another location over one or more types of ground surfaces. With respect to the item being a ladder, the method may further comprise inserting a foot of each of a front rail of the ladder and a corresponding back rail of the ladder into a cavity or opening of the mount protruding from the base of the caddy. The methods may further comprise coupling by press fit or friction fit each of the front rail and the corresponding back rail between the first face of the base of the caddy and a securing mechanism in communication with the base. The method may further comprise applying force to the ladder to transition the caddy from a first position to a second position, wherein in the second position the ladder is less vertical than in the first position. The method may further comprise transporting the ladder on the caddy by applying force to the ladder. The method may further comprise the ladder being oriented on its side during the transportation of the ladder on the caddy.

The materials of construction of the caddy 10, may be formed of any of many different types of materials or combinations thereof that can readily be formed into shaped objects provided that the components selected are consistent with the intended operation of hand trucks, dollies, and caddies of the type disclosed herein. For example, and not limited thereto, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining the above-described caddy 10 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, 3-D printing, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components, for example.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A caddy for transporting one or more long and slender items, the caddy comprising:
    a base having a first face and a second face;
    a tray coupled to the first face and extending away therefrom, the tray defining a tray opening;
    a substantially rigid clamping mechanism functionally coupled to the base, the clamping mechanism configured to transition toward the first face; and
    a wheel assembly coupled to the base on the second face;
    wherein the tray opening receives a first portion of an item and the clamping mechanism engages a second portion of the item, wherein as the clamping mechanism transitions toward the first face the clamping mechanism retains the item between the clamping mechanism and the first face by friction fit, and
    wherein the item is a ladder and the first portion is a foot of each of a front rail and a corresponding back rail of the ladder, and wherein the second portion is a leg of each of the front rail and the corresponding back rail.

2. The caddy of claim 1, wherein the base is configured to pivot about the wheel assembly to transition the caddy between an upright position and a prone position.

3. The caddy of claim 2, wherein with the item coupled to the caddy, a force on the item transitions the caddy between the upright and prone positions.

4. The caddy of claim 2, wherein in the prone position a length of the item is closer to horizontal than vertical.

5. The caddy of claim 2, wherein in the prone position the item is oriented on its side.

6. The caddy of claim 1, wherein the clamping mechanism further comprises an engagement member, a fastener, and a support, wherein the support is in communication with the base and functionally couples the fastener to the engagement member with the engagement member and the fastener positioned on opposing sides of the base, wherein with the ladder coupled to the caddy the engagement member contacts the front rail and the corresponding back rail, the fastener maintains the engagement member in contact with the front rail and the corresponding back rail, and the support is configured between the front rail and the corresponding back rail.

7. A caddy for transporting a ladder, the caddy comprising:
    a substantially rigid base;
    a mount coupled to the base and extending therefrom, the mount defining a cavity;
    an engagement member operatively coupled to the base and configured to transition with respect to the base; and
    a wheel assembly comprising an axle coupled to the base and a pair of wheels coupled to opposing ends of the axle;
    wherein the cavity receives a foot of each of a front rail and a corresponding back rail of the ladder and the engagement member transitions toward the base to contact each of the front rail and the corresponding back rail to engage by friction fit the ladder between the engagement member and the base.

8. The caddy of claim 7, further comprising a fastener in operative communication with the engagement member and configured to transition and secure the engagement member in position with respect to the base.

9. The caddy of claim 7, further comprising ridges on the mount, wherein the ridges define the cavity and are configured to prevent the ladder from slipping out of the cavity.

10. The caddy of claim 7, wherein a width between the wheels is less than 13.5 inches.

11. The caddy of claim 7, further comprising wings on the engagement member, wherein the wings protrude from distal ends of the engagement member toward the base.

12. The caddy of claim 7, wherein the base is configured to pivot about the axle to transition the caddy between an upright position and a prone position.

13. The caddy of claim 12, wherein with the ladder coupled to the caddy, a force on the ladder transitions the caddy between the upright and prone positions.

14. The caddy of claim 12, wherein in the prone position a length of the ladder is closer to horizontal than vertical.

15. The caddy of claim 12, wherein with the ladder coupled to the caddy and the caddy in the prone position the ladder is oriented on its side.

16. A method of transporting a ladder on a caddy, the method comprising:
    providing a caddy with a first face and a second face, the caddy having a mount coupled to the first face and a wheel assembly coupled to the second face;
    inserting a foot of each of a front rail of the ladder and a corresponding back rail of the ladder into a cavity of the mount protruding from the base;
    coupling by press fit each of the front rail and the corresponding back rail between the first face of the base and a securing mechanism in communication with the base;
    applying force to the ladder to transition the caddy from a first position to a second position, wherein in the second position the ladder is less vertical than in the first position;
    transporting the ladder on the caddy.

17. The method of claim 16, wherein the ladder is oriented on its side during the transportation of the ladder on the caddy.

* * * * *